US008838845B2

(12) United States Patent
Rabii et al.

(10) Patent No.: US 8,838,845 B2
(45) Date of Patent: Sep. 16, 2014

(54) MULTIMEDIA INTERFACE WITH CONTENT PROTECTION IN A WIRELESS COMMUNICATION DEVICE

(75) Inventors: Khosro M. Rabii, San Diego, CA (US); Jatin Naik, Brampton (CA)

(73) Assignee: QUALCOMM Incorporated, San Diego, CA (US)

(*) Notice: Subject to any disclaimer, the term of this patent is extended or adjusted under 35 U.S.C. 154(b) by 223 days.

(21) Appl. No.: 13/243,548

(22) Filed: Sep. 23, 2011

(65) Prior Publication Data

US 2013/0080663 A1    Mar. 28, 2013

(51) Int. Cl.
*G06F 3/00* (2006.01)
*G09G 5/00* (2006.01)
*G06F 11/34* (2006.01)
*G06F 1/32* (2006.01)
*H04L 12/64* (2006.01)

(52) U.S. Cl.
CPC ............ *G06F 11/3485* (2013.01); *G09G 5/006* (2013.01); *G06F 1/3206* (2013.01); *G09G 2370/12* (2013.01); *G09G 2330/021* (2013.01); *H04L 12/6418* (2013.01)
USPC .................. 710/18; 710/15; 710/16; 710/17; 710/19

(58) Field of Classification Search
CPC .......... G09G 2370/12; G09G 2330/21; H04N 21/472; H04N 21/25825; G06F 11/3485; G06F 1/3206
See application file for complete search history.

(56) References Cited

U.S. PATENT DOCUMENTS 7,386,641 B2    6/2008    Xu et al.
7,512,396 B2    3/2009    Han et al.
(Continued)

FOREIGN PATENT DOCUMENTS

| EP | 2237263 A1 | 10/2010 |
| JP | 2010232762 A | 10/2010 |
| WO | 2009118582 A1 | 10/2009 |
| WO | 2010051281 A2 | 5/2010 |

OTHER PUBLICATIONS

International Search Report and Written Opinion—PCT/US2012/051178—ISA/EPO—Oct. 22, 2012 (9 pages).

(Continued)

*Primary Examiner* — Idriss N Alrobaye
*Assistant Examiner* — Ronald Modo
(74) *Attorney, Agent, or Firm* — Shumaker & Sieffert, P.A.

(57) ABSTRACT

In general, this disclosure relates to techniques for management of a multimedia connection between a wireless communication device (WCD) and one or more output devices. The connection may be a multimedia interface connection with content protection, e.g., High Definition Multimedia Interface (HDMI). In some cases, the multimedia interface connection with content protection may be inactive because the output device is no longer connected or the multimedia application is stopped or paused. The techniques include detecting a use mode of the multimedia interface connection with content protection between the WCD and one or more output devices. When the use mode of the multimedia interface connection with content protection is inactive, the WCD may reduce at least one of content processing or content protection processing. In this way, the techniques may reduce battery power consumption from multimedia processing by the WCD.

32 Claims, 6 Drawing Sheets

(56) References Cited

U.S. PATENT DOCUMENTS

| | | |
|---|---|---|
| 2006/0209884 A1 | 9/2006 | MacMullan et al. |
| 2008/0232209 A1 | 9/2008 | Vergoossen et al. |
| 2008/0263448 A1* | 10/2008 | Oppenheimer ............... 715/719 |
| 2010/0235552 A1* | 9/2010 | Holden et al. .................. 710/72 |
| 2010/0332569 A1 | 12/2010 | Bryant-Rich et al. |
| 2011/0013576 A1* | 1/2011 | Hsu ............................... 370/329 |
| 2011/0296465 A1* | 12/2011 | Krishnan et al. ................ 725/51 |
| 2012/0008052 A1* | 1/2012 | Funabiki et al. .............. 348/723 |
| 2012/0133484 A1* | 5/2012 | Griffin ........................ 340/5.54 |

OTHER PUBLICATIONS

Second Written Opinion—PCT/US2012/051178—IPEA/EPO—Oct. 22, 2013 (6 pages).
Silicon Image: "sil9224 Vastlane Mobile HD Link Transmitter," Internet Citation, May 14, 2008, pp. 1-2, XP002579469, Retrieved from the internet: URL:http://www.siliconimage.com/doos/Sil9224_pb_FINAL_5-14-08.pdf (retrieved on Apr. 23, 2010).
International Preliminary Report on Patentability from international application No. PCT/US2012/051178, mailed Jun. 3, 2014, 6 pp.

* cited by examiner

MULTIMEDIA INTERFACE WITH CONTENT PROTECTION IN A WIRELESS COMMUNICATION DEVICE

TECHNICAL FIELD

The disclosure relates to multimedia applications and, more particularly, management of multimedia applications in a wireless communication device.

BACKGROUND

Wireless communication devices (WCDs), such as mobile telephones, portable computers with wireless communication cards, and personal digital assistants (PDAs), portable media players, or other flash memory devices with wireless communication capabilities, are typically powered by limited battery resources. Improved battery life and battery life conservation are, therefore, of paramount concern when designing WCDs. The concern for battery life is offset, however, by demands by users for increased use of multimedia applications on WCDs and transferring multimedia content over a multimedia interface between WCDs and display devices.

Multimedia applications on a WCD can be displayed and/or played back on external devices by transferring multimedia content between the WCD and the external devices via multimedia interfaces. Typically, a multimedia interface with content protection, e.g. High Definition Multimedia Interface (HDMI), is utilized to ensure secure transmission of content between devices to prevent unauthorized users from receiving the content. The content protection requires additional processing for authentication, revocation, encryption, and link integrity checks. The processing associated with receiving and/or creating multimedia content on WCDs in addition to the processing associated with content protection when multimedia content is transmitted using multimedia interfaces with content protection consumes a significant amount of power.

SUMMARY

In general, this disclosure relates to techniques for management of multimedia applications in a wireless communication device (WCD). The techniques include detecting a use mode of a multimedia interface connection with content protection, e.g., High Definition Multimedia Interface (HDMI), between a WCD and one or more output devices, and reducing at least one of content processing or content protection processing when the use mode is inactive. In this way, the techniques may reduce battery power consumption from multimedia processing by the WCD.

To transmit multimedia content to an output device via the multimedia interface connection with content protection, the WCD may perform content processing for one or more multimedia applications for presentation by the output device. In addition, the WCD may perform content protection processing for secure transmission of the processed content to the output devices via the connection. In some cases, however, the multimedia interface connection with content protection may be inactive because the output device is no longer connected or the multimedia application is stopped or paused. According to the techniques of this disclosure, when the use mode of the multimedia interface connection with content protection is inactive, the WCD may reduce power consumption by reducing content processing and/or content protection processing.

In one example, the disclosure is directed to a method of managing external connections of a wireless communication device, the method comprising detecting, with a processor in the wireless communication device, a use mode of a connection between the wireless communication device and one or more output devices, wherein the connection comprises a multimedia interface connection with content protection, performing content processing for at least one application of the wireless communication device for presentation by the output devices, performing content protection processing for secure transmission of the processed content to the output device via the connection, and reducing at least one of the content processing or the content protection processing when the use mode of the connection is inactive.

In another example, the disclosure is directed to a wireless communication device capable of managing external connections, the wireless communication device comprising one or more processors that detects a use mode of a connection between the wireless communication device and one or more output devices, wherein the connection comprises a multimedia interface connection with content protection, performs content processing for at least one application of the wireless communication device for presentation by the output devices, performs content protection processing for secure transmission of the processed content to the output device via the connection, and reduces at least one of the content processing or the content protection processing when the use mode of the connection is inactive.

In another example, the disclosure is directed toward a wireless communication device capable of managing external connections, the wireless communication device comprising means for detecting a use mode of a connection between the wireless communication device and one or more output devices, wherein the connection comprises a multimedia interface connection with content protection, means for performing content processing for at least one application of the wireless communication device for presentation by the output devices, means for performing content protection processing for secure transmission of the processed content to the output device via the connection, and means for reducing at least one of the content processing or the content protection processing when the use mode of the connection is inactive.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, in another example, the disclosure is directed to a computer program product comprising a computer-readable medium having stored thereon instructions that, when executed cause a processor to detect a use mode of a connection between a wireless communication device and one or more output devices, wherein the connection comprises a multimedia interface connection with content protection, perform content processing for at least one application of the wireless communication device for presentation by the output devices, perform content protection processing for secure transmission of the processed content to the output device via the connection, and reduce at least one of the content processing or the content protection processing when the use mode of the connection is inactive.

The details of one or more examples of the disclosure are set forth in the accompanying drawings and the description below. Other features, objects, and advantages will be apparent from the description and drawings, and from the claims.

DETAILED DESCRIPTION

In general, this disclosure relates to techniques for reducing battery consumption associated with a wireless communication device (WCD) with multimedia applications. The techniques may detect a use mode of a multimedia interface connection with content protection, e.g., High Definition Multimedia Interface (HDMI), between a WCD and one or more external output devices. When the use mode is inactive, at least one of content processing or content protection processing may be reduced to reduce battery power consumption from multimedia processing by the WCD. The WCD may perform content processing for one or more media applications for presentation by the output devices and/or content protection processing for secure transmission of the processed content to the output devices via the connection. According to the techniques of this disclosure, when the use mode of the multimedia interface connection with content protection is inactive, the WCD may reduce the power consumption by reducing the content processing and/or the content protection processing.

Figure 1:
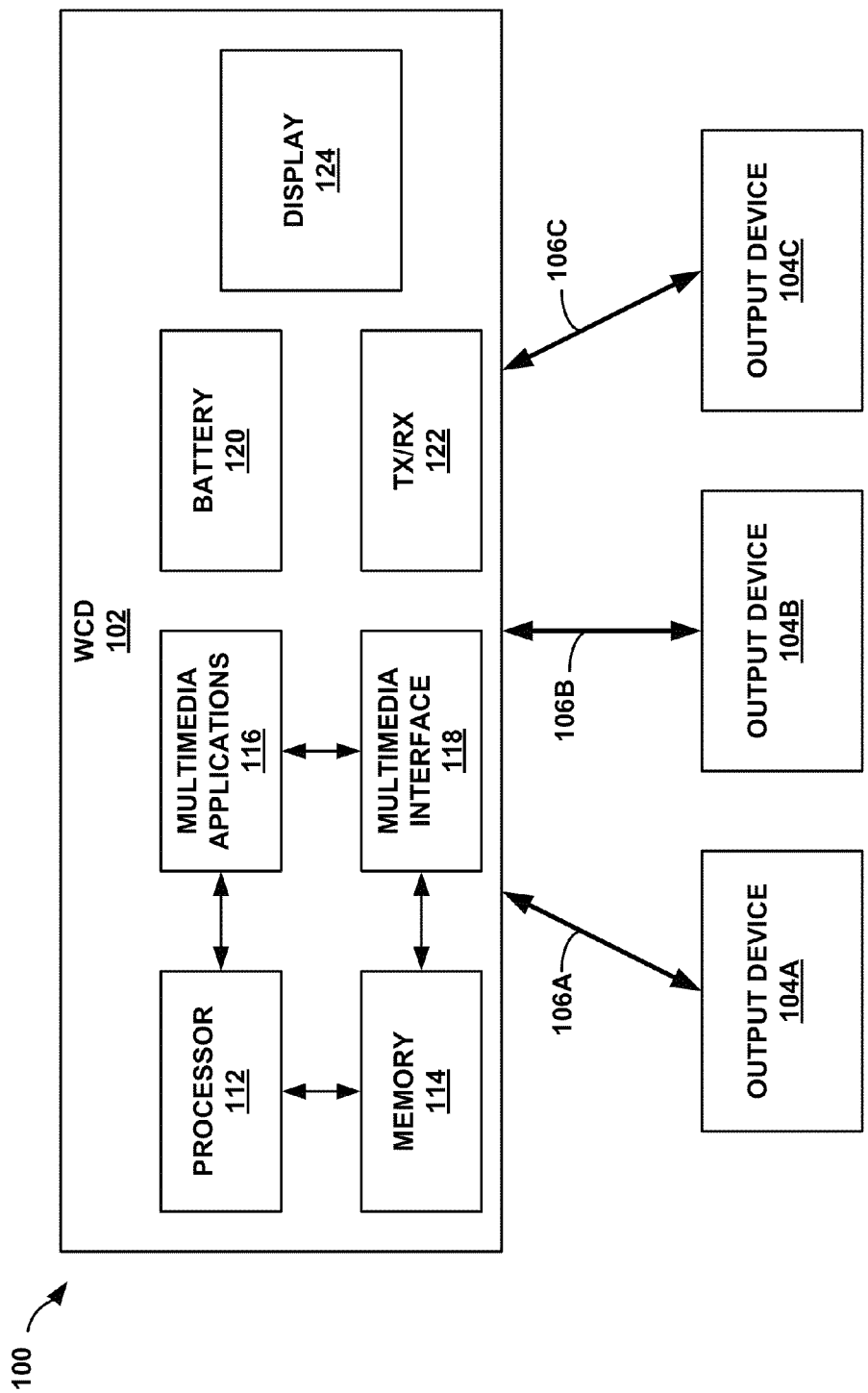
FIG. 1 is a block diagram illustrating an example wireless communication system in which a wireless communication device (WCD) is connected to one or more external multimedia output devices.

FIG. 1 is a block diagram illustrating a wireless communication system 100 in which a wireless communication device (WCD) 102 is connected to one or more external multimedia output devices 104A-104C ("output devices 104"). WCD 102 may include processor 112, memory 114, one or more multimedia applications 116, multimedia interface 118, battery 120, transceiver 122, and display 124. It should be understood that WCD 102 may include other components, which may depend on the type of device or functionalities associated with WCD 102. In one example, WCD 102 may be a communication device, such as a mobile phone, a smart phone, a tablet computer, a PDA, a portable media player, or the like. WCD 102 may utilize transceiver 122 to communicate with other devices via a network, e.g., a cellular network, a local wireless network, and the like.

Multimedia interfaces with content protection are becoming common, and in some cases mandatory, interfaces for digital multimedia devices that include multimedia applications. The multimedia interfaces with content protection may be used to connect digital multimedia source devices, such as set-top boxes, DVD and Blu-Ray Disc players, digital video recorders, personal computers, video game consoles, and the like, with compatible digital multimedia sink devices (also referred to herein as external output devices), such as digital televisions, digital audio devices, computer monitors, video projectors, and other devices capable of outputting and/or displaying multimedia content. The multimedia interfaces with content protection may support wired connections or wireless connections between the source devices and the sink devices. A source device processes the multimedia content for presentation on a given sink device in the format required by the sink device. The multimedia interface with content protection enables a source device to securely transmit the multimedia content for presentation by the sink device using an encryption standard, e.g., high-bandwidth digital content protection (HDCP), to prevent unauthorized users from receiving the content. The content protection over the multimedia interfaces requires additional processing for device detection, authentication, revocation, encryption, and link integrity checks, for example.

WCD 102 may comprise, for example, a smart phone or pad that receives multimedia content. In the illustrated example of FIG. 1, WCD 102 includes multimedia interface with content protection 118 in order to transmit the multimedia content to output devices 104 for presentation. In this way, a user is able to have the content presented on one of output devices 104, such as a digital television or computer monitor, capable of providing much higher video resolution or higher fidelity audio than local display 124 of WCD 102.

In one example, multimedia interface 118 of WCD 102 may include a high-definition multimedia interface (HDMI), wireless HDMI, mobile high-definition link (MHL), or another interface capable of providing secure digital multimedia content. When WCD 102 with multimedia interface with content protection 118 is connected to the one or more external output devices 104, WCD 102 may perform processing of media (e.g., audio and/or video) content from multimedia applications 116 for presentation by external output devices 104. WCD 102 may also perform content protection processing to securely transmit the multimedia content to output devices 104 via multimedia interface connections with content protection 106A, 106B, and 106C ("multimedia interface connections 106").

Traditionally, multimedia interfaces with content protection have been included only in wired devices (e.g., a desktop computer) that have little or no concern for battery usage. The techniques of this disclosure recognize that the processing required for operations over multimedia interface with content protection 118 may utilize a significant amount of battery power in WCD 102. The techniques may include detecting a use mode of multimedia interface connections with content protection 106 between WCD 102 and one or more output devices 104, and, when the use mode is inactive, reducing at least one of content processing or content protection processing to reduce battery consumption. As noted above, content processing may include preparing multimedia content from one or more multimedia applications running on WCD 102 for presentation on local display 124 or on external output devices 104. Content protection processing may include processing that ensures secure transmission of the multimedia content from one device to another, for example from WCD 102 to external output devices 104. Content protection procession may include, for example, encryption of the multimedia content. Secure transmission of the multimedia content may ensure that multimedia content does not get accessed by an unauthorized party or device.

WCD 102 may run processes and applications, such as multimedia applications 116. In some examples, WCD 102 may include display 124 (e.g., LCD screen) that displays multimedia content produced by multimedia applications 116. Display 124 of WCD 102 may display the multimedia content at a low-resolution, because display 124 of WCD 102 may be small and it may not make a difference whether the multimedia content is high or low resolution. Additionally, displaying multimedia content at a low-resolution may conserve processing power in WCD 102. However, in some examples, WCD 102 may be connected to output devices 104, which may present multimedia content received from WCD 102 for multimedia applications 116. WCD 102 may process the multimedia content for multimedia applications 116 and provide it to output devices 104 at a higher resolution appropriate for presentation on a larger display, for example.

Processor 112 of WCD 102 may be operable to execute one or more algorithms that include, for example, an algorithm for managing external connections between WCD 102 and external output devices 104. The algorithm for managing external connections may be stored in memory 114 or may be stored in a separate module accessible by processor 112. In one example, processor 112 may execute the algorithm for managing external connections to manage operations associated with multimedia interface with content protection 118 and multimedia interface connections 106 to reduce battery usage. The operations may include content processing and content protection processing of content transferred from WCD 102 to output devices 104 via multimedia interface connections 106 through multimedia interface 118. For example, processor 112 may detect a use mode of one of connections 106 between WCD 102 and external output devices 104, and reduce at least one of content processing or content protection processing when the detected use mode is inactive, according to the techniques described in this disclosure.

Memory 114 may include one or more computer-readable storage media. Memory 114 may comprise one or more storage devices, capable of long-term and short-term storage of information. Short-term storage of memory 114 may also be described as a volatile memory. Examples of volatile memories include random access memories (RAM), dynamic random access memories (DRAM), static random access memories (SRAM), and other forms of volatile memories known in the art. Long-term storage of memory 104 may also be described as non-volatile memory. Examples of such non-volatile storage elements may include magnetic hard discs, optical discs, floppy discs, flash memories, or forms of electrically programmable memories (EPROM) or electrically erasable and programmable (EEPROM) memories. In one example, memory 114 may be used to store program instructions for execution by processor 112 such as, for example, an algorithm for managing external connections. Memory 114 may also be used by software and/or applications running on WCD 102 to store information during program execution or during operation.

Multimedia applications 116 may be applications running on WCD 102 and may provide multimedia content, such as video and/or audio content. Some examples of multimedia applications 116 may be video and/or audio playback applications, Web-TV, Web-Radio, and the like. The content provided by multimedia applications 116 may be obtained from memory 114 (e.g., captured video and/or audio) or from an external source (e.g., the Internet). Processor 112 may process the multimedia content for presentation on display 124 of WCD 102. It may be desirable, however, to have the multimedia content presented on output devices 104 that provide higher video resolution and/or higher fidelity audio.

WCD 102 may establish connections 106 with one or more output devices 104 via multimedia interface 118. Multimedia interface 118 comprises a multimedia interface with content protection capable of providing secure digital multimedia content. As noted above, some examples of multimedia interface with content protection may be HDMI, MHL, and the like. The example of HDMI will be used for purposes of this discussion; it should be understand, however, that the techniques of this disclosure may be applicable to other types of multimedia interfaces with content protection.

When WCD 102 is connected to one or more output devices 104, WCD 102 may process the multimedia content from multimedia applications 116 for presentation on output devices 104. WCD 102 may also perform content protection processing to ensure secure transmission of the multimedia content to output devices 104 via multimedia interface 118. As noted above, processor 112 of WCD 102 may execute an algorithm for managing external connections. For example, processor 112 may detect a use mode of connections 106 between WCD 102 and one or more output devices 104, and adjust the multimedia processing based on the detected use mode.

In one example, processor 112 may monitor connections 106 for a signal to determine whether one or more output devices 104 is connected to WCD 102. In one example, the signal may be a hot-plug-detect (HPD) signal. If a HPD signal, for example, is not detected on the connection, processor 112 determines that one or more output devices 104 are no longer connected to WCD 102 and sets the use mode of the connection as inactive. In this example, where the multimedia interface connection with content protection 106 is disconnected during active operation (i.e., during operation of multimedia applications 116), processor 112 may determine the use mode to be inactive and reduce processing on WCD 102 to conserve power of battery 120.

When the multimedia interface connection with content protection 106 is disconnected, processor 112 may stop processing multimedia content in high resolution that is typically required for presentation on output devices 104. Processor 112 may instead process multimedia content in a low resolution format that may be more suitable and acceptable for presentation on local display 124 of WCD 102. Local display 124 may have a much smaller resolution than output devices 104 and may also require much less battery power for content processing. For example, processor 112 may reconfigure a graphic processing unit (GPU) of WCD 102 to process content for local display 124. In addition to reducing multimedia content processing, processor 12 may also suspend content protection processing for the disconnected multimedia interface connection with content protection 106, which may also reduce the amount of battery power consumed.

In another example, processor 112 may monitor the operation of one of multimedia applications 116 running on WCD 102 to determine the status of the one of multimedia applications 116. The status of the multimedia application may be playing, paused, or stopped. If the application is paused or stopped, processor 112 determines that no content is being transmitted over multimedia interface connection 106 and, therefore, the use mode is inactive. Processor 112 may then reduce processing of the multimedia content to conserve battery power. Typically, when one of multimedia applications 116 is stopped or paused, the multimedia application presents a blank frame or the last displayed frame on the display. For example, according to the techniques, processor 112 may process the blank frame or the last displayed frame from the one or multimedia applications 116 at a minimum data resolution acceptable by the one of output devices 104 currently presenting the multimedia content. In another example, processor 112 may stop processing content from the one of multimedia applications 116 and instead process a low resolution test pattern from memory 114 for presentation by the output devices 104. Reducing the resolution of the multimedia content for presentation on the output devices 104 consumes much less battery power for content processing.

In addition, if the one of multimedia applications 116 is paused or stopped, processor 112 may suspend content protection processing for the multimedia interface connection with content protection 106, because no unique or new content is being transmitted over the connection. For example, processor 112 may suspend one or more content protection functionalities, such as device detection processing, revocation procession, encryption processing, and link-integrity check processing. Suspending additional content protection processing on WCD 102 when no content in need of protection is being transmitted to output devices 104 may significantly reduce battery usage.

Regardless of whether the use mode of the connection is active or inactive, however, processor 112 may continue to perform authentication processing with each of output devices 104. The authentication processing requires WCD 102 to perform a handshake with each of output devices 104, which in the example of the HDCP specification may include up to 7 repeaters and 127 sink devices (e.g., output devices 104). By maintaining the authenticated connections with each of output devices 104, even when the use mode of the connection is inactive, WCD 102 may avoid using a large amount of battery power for re-authentication processing.

Figure 2:
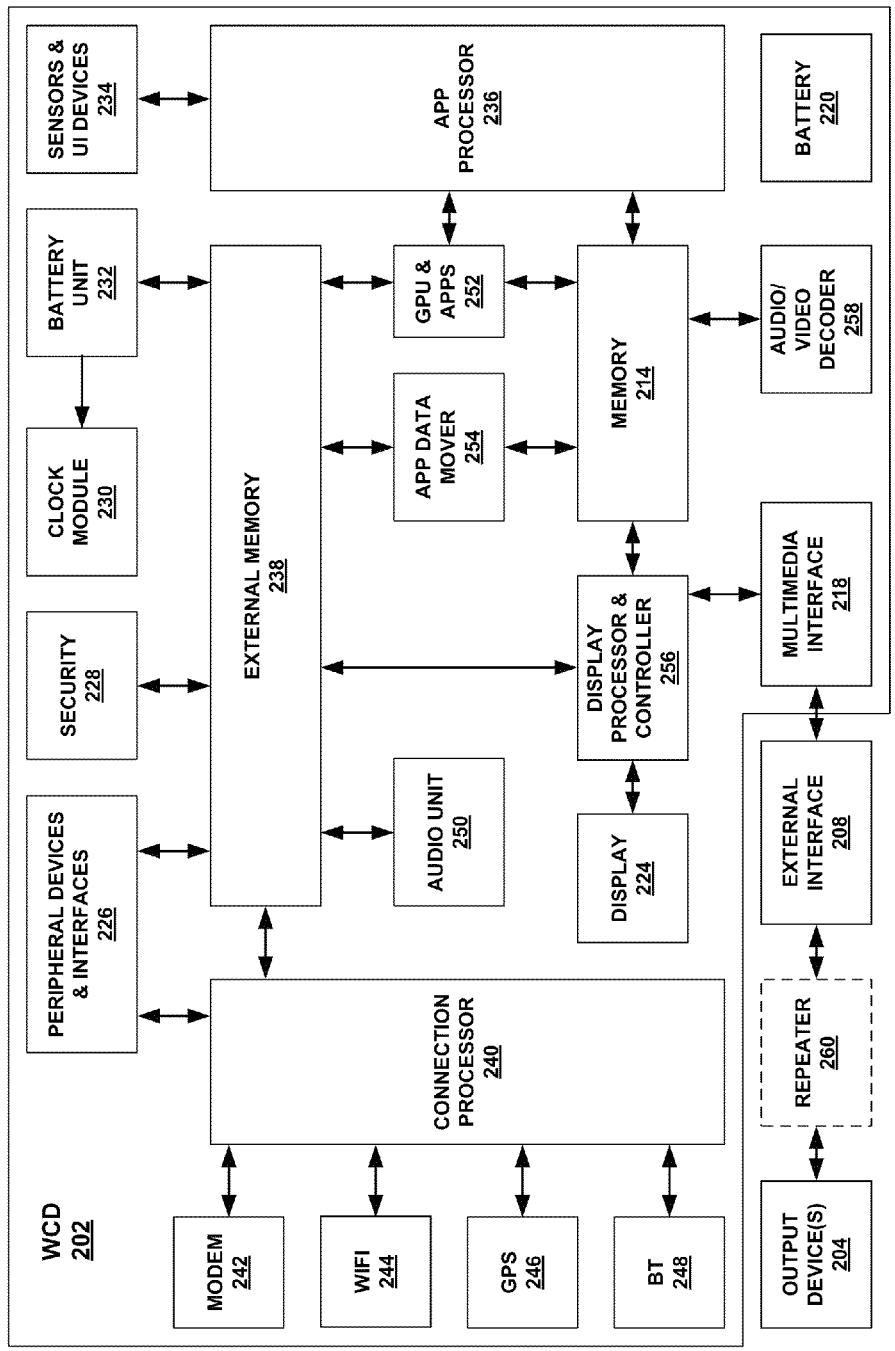
FIG. 2 is a block diagram illustrating an example of a wireless communication system that includes a WCD with a multimedia interface with content protection.

FIG. 2 is a block diagram illustrating an example of a wireless communication system that includes WCD 202 with a multimedia interface with content protection 218. WCD 202 of FIG. 2 illustrates an example architecture of WCD 102 of FIG. 1. In the example of FIG. 2, the multimedia interface with content protection 218 of WCD 202 may comprise HDMI. Multimedia interface with content protection 218 may be capable of providing secure digital multimedia content, and may be used by WCD 202 to transmit multimedia content from multimedia applications on WCD 202 for presentation on one or more output devices 204, which may be substantially similar to output devices 104 of FIG. 1. In one example, output devices 204 may be external HDMI-connected devices.

In one example, as FIG. 2 illustrates, WCD 202 may include several components, though the architecture of WCD 202 is not limited to that shown in FIG. 2. WCD 202 may include several communication modules and units, e.g., modem 242, WiFi 244, global positioning system (GPS) 246, and Bluetooth (BT) 248. The communication modules and units may be managed by connection processor 240, which may be a dedicated processor for communication purposes or may be part of a general processor of WCD 202. WCD 202 may also include a peripheral devices and interfaces module 226, security module 228, clock module 230, battery unit 232, and sensors and user interface devices 234. Battery unit 232 may include a battery monitor, and platform resource and power management functionalities for monitoring and managing a power source of WCD 202, such as battery 220, for example. WCD 202 may utilize an external memory unit 238 to supplement its internal on-chip memory 214, where external memory 238 may be connected to several modules and units in WCD 202.

WCD 202 may also include a graphical processing unit (GPU) and applications 252, which may include, for example, multimedia applications such as multimedia applications 116 of WCD 102 from FIG. 1. GPU and apps 252 may interact with several units within WCD 202 during its operation of processing and producing multimedia content. Application processor 236 may provide processing of multimedia content, and may be a dedicated processor or part of a general processor associated with WCD 202. Application data mover 254 may manage moving data, e.g., multimedia data, to the appropriate memory location (e.g., external memory 238 and/or on-chip memory 214). In some examples, multimedia content may be obtained from network sources (e.g., the Internet) or may be obtained by sensors in WCD 202 (e.g., built-in camera) and/or from another multimedia unit (e.g., audio unit 250). WCD 202 may also include audio/video decoder 258, which may decode encoded multimedia content obtained by WCD 202 before display. Multimedia content may be processed for display by display processor and controller 256. In some examples, multimedia content may be processed and displayed locally on display 224. In other example, multimedia content may be processed for display on external devices, e.g., output devices 204, to which multimedia content is transmitted through multimedia interface 218.

WCD 202 may establish a connection with one or more output devices 204 via multimedia interface 218. Multimedia interface 218 may be a multimedia interface with content protection capable of providing secure digital multimedia content. Multimedia interface 218 may be connected to external interface 208, through which protected multimedia content is transmitted to external devices (e.g., repeater 260 and/or output devices 204). External interface 208 may be an external interface bridge or docking station.

Output devices 204 may be connected to WCD 202 to display multimedia content provided by a multimedia application in GPU and apps 252 on WCD 202. The multimedia content may be processed to a higher resolution that is more suitable for presentation on output devices 204. Output devices 204 may be connected to WCD 202 via a multimedia interface with content protection 218, e.g., HDMI. Display processor and controller 256 may manage the HDMI connection by detecting a use mode of the HDMI connection between WCD 202 and one or more output devices 204, and adjust the multimedia processing based on the detected use mode. For example, when the HDMI connection is inactive, display processor and controller 256 may reduce at least one of content processing and content protection processing in order to reduce battery consumption by WCD 202, as explained above.

Content processing for the HDMI connection may include preparing multimedia content from one or more multimedia applications in GPU and apps 252 operating on WCD 202 for presentation on local display 224 or on HDMI-connected output devices 204.

Content protection processing of the HDMI connection may include performing device detection, authentication, revocation, encryption, and link integrity check for each external device, e.g., one or more output devices 204 or repeater 260. In this discussion the example of high bandwidth digital content protection (HDCP) may be utilized as the digital protection standard for the multimedia content. However, it should be understood that other forms of digital content protection may be utilized.

For detection of external devices, the HDMI connector may include an HPD pin that allows an external device, which may be a repeater (e.g., repeater 260) or a sink device (e.g., output device 204), to provide a signal (e.g., +5 VDC) on the HPD pin, causing WCD 202 to initiate a display data channel (DDC) query. The DDC query may interrogate external HDMI-connected output device 204 to determine the display capabilities of output device 204. The DDC query may also determine whether output device 204 is HDCP-compliant. Typically, an HDMI source (e.g., WCD 202) may be required to supply a minimum of 55 mA over the HPD pin.

After WCD 202 detects output device 204, the WCD may authenticate output device 204 and/or repeater 260. In the case of output device 204, based on the DDC query, WCD 202 may determine if output device 204 is authorized to receive the multimedia content. Authentication may involve output device 204 and WCD 202 exposing their public key. WCD 202 and output device 204 may then independently derive a common session-key with their private key to complete authentication. If output device 204 is authorized to receive the multimedia content, WCD 202 then encrypts multimedia content transmitted to output device 204 to prevent eavesdropping. WCD 202 may similarly authenticate repeater 260. WCD 202 may maintain connection integrity to avoid a re-authentication penalty, which is potentially re-authentication overhead for all downstream HDMI devices (e.g., repeaters 260 and output devices 204). For example, HDCP allows WCD 202 to connect to as many as 127 sink devices (e.g., output device 204) with 7 repeaters (e.g., repeater 260), therefore, up to 127 devices connected together with up to 7 levels.

Following authentication, revocation may take place, where WCD 202 reviews System Renewability Messages (SRMs) provided within the multimedia content. The SRMs may contain lists of revoked Key Selection Vectors (KSVs). WCD 202 then compares the revoked KSVs to downstream KSVs obtained from repeater 260 and/or output devices 204, and stops transmitting protected multimedia content to repeaters/output devices listed in SRM.

WCD 202 may then encrypt multimedia content using encryption keys. For example, WCD 202 may exclusive-OR (XOR) the multimedia content with cipher values, which may be derived from the session key. Repeater 260 and/or output devices 204 also XOR the encrypted multimedia content with the same cipher values derived from the initial session key to decrypt the multimedia content.

In addition, WCD 202 may periodically check integrity of the link with repeater 260 and/or output devices 204 to ensure encryption of the multimedia content is reliable, by using a verification process. For example, WCD 202 may utilize a 16-bit integrity check delivered by repeater 260 and/or output devices 204 every 128 frames. The verification process may occur periodically, e.g., every 1.5-2.5 seconds. Display processor and controller 256 may configure display settings based on the status of a connection between the HDMI-device (e.g., output device 204) and WCD 202. In one example, output device 204 may be connected through a multimedia interface connection with content protection 218 (e.g., HDMI). Multimedia applications running on WCD 202 may provide multimedia content, which may be processed by a processor (e.g., display processor and controller 256). When output device 204 is connected to WCD 202, the multimedia content may be processed to accommodate the requirements of output device 204 (e.g., higher resolution, higher audio quality, and the like) for presenting the multimedia content. The multimedia content is processed for presentation on the connected output device 204 and processed for content protection for transmission to the output device over the multimedia interface with content protection 218.

If output device 204 becomes disconnected or the multimedia application is paused or stopped, processing of the multimedia and/or the content protection processing may be reduced to reduce the battery power consumed. If output device 204 becomes disconnected, display processor and controller 256 may stop processing multimedia content in high resolution typically required for presentation on output devices 204. Display processor and controller 256 may instead process multimedia content in a low resolution format that may be more suitable and acceptable for presentation on local display 224, which may require much less battery power for content processing. In addition to reducing multimedia content processing, content protection processing may be suspended for the disconnected multimedia interface connection with content protection, which may also reduce the amount of battery power consumed.

If the multimedia application is paused or stopped, processing of the multimedia content may be modified to reduce the battery power consumption. In one example, display processor and controller 256 may process a blank frame or the last displayed frame from the multimedia application at a minimum data resolution acceptable by output device 204 presenting the multimedia content. In another example, display processor and controller 256 may stop processing content from the multimedia application and instead process a low resolution test pattern from memory 214 for presentation by output device 204. Reducing the resolution of the multimedia content for presentation on the output devices consumes much less battery power for content processing. In addition to reducing the processing of the content, content protection processing for the multimedia interface connection with content protection may be suspended, because no unique or new content is being transmitted over the connection. For example, one or more content protection functionalities may be suspended, such as device detection processing, revocation procession, encryption processing, and link-integrity check processing. Suspending additional processing on WCD 202 when no content in need of protection is being transmitted may significantly reduce battery usage.

Examples of multimedia applications running on WCD 202 that may allow pause/stop include AUD/VID FilePlayback, WEB-TV (e.g., YouTube), WEB-News (e.g., CNN), WEB-Tune (e.g., NPR), OnLine-Gaming, and the like. As described above, according to the techniques, asserting pause/stop may result in modifying processing of the multimedia content. For example, pause/stop may result in configuring the HDMI connection for minimum multimedia content resolution acceptable by output device 204. For example, a pause/stop may result in reconfiguring the HDMI connection by asserting AVMUTE, which results in stopping encryption, in addition to causing the output device to stop processing incoming data.

Additionally, the traditional device detection processing may be suspended by switching off the +5 VDC and ignoring signals on the HPD pin to conserve battery power. In this example, WCD 202 may continue to detect the presence of downstream HDMI devices (e.g., repeater 260 and output devices 204) by checking that transition minimized differential signaling (TMDS) differential pairs remain terminated. TMDS is the data transmission protocol of HDMI and may be terminated during pause/stop status. WCD 202 may signal to output device 204 not to process any received multimedia content, and may optionally cache the multimedia content from on-chip memory 214 for local display on display 224. WCD 202 may also stop the HDCP authentication process. Finally, during this mode, the link integrity check and revocation processing may be suspended, which further reduces the amount of battery power consumed.

Figure 3:
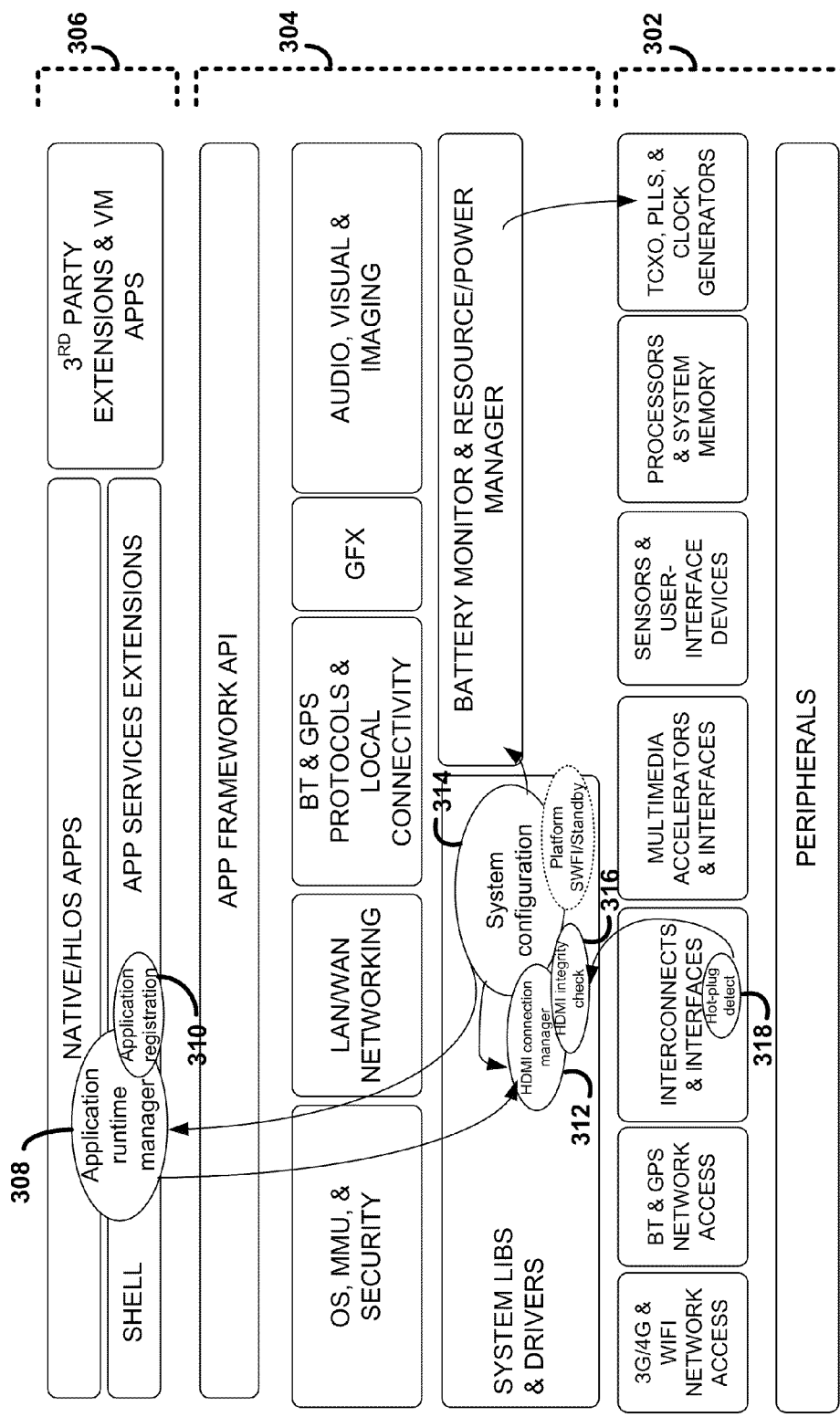
FIG. 3 is a block diagram illustrating an example software model for reducing battery consumption in a WCD with a multimedia interface with content protection.

FIG. 3 is a block diagram illustrating a software model for reducing battery consumption in a WCD with a multimedia interface with content protection. In the example of FIG. 3, the multimedia interface with content protection is HDMI, as an illustrative example. The HDMI battery consumption reduction software model may include hardware platform 302, software platform 304, and application environment 306. The different parts of the software model of FIG. 3 may be implemented in WCD 102 and controlled/executed by processor 112, for example.

The software model for the WCD may include hardware platform 302, software platform 304, and application environment 306. Hardware platform 302 may include, for example, network access units (e.g., modem, WiFi, GPS, and BT), interconnects and interfaces (e.g., hot-plug detect 318), multimedia accelerators and interfaces, sensors and user interface devices, processors and memory units, clock-related modules, and the like.

Software platform 304 may include software modules such as, for example, application framework application programming interface (API), operating system and memory management and security units, local area networks (LAN) and wide area networks (WAN) networking units, protocols associated with network access units, graphics units, multimedia (e.g., audio, video, imaging) protocols, system libraries and drivers, and battery monitoring and management modules. Software platform 304 may include, for example, system configuration module 314 and connection management modules (e.g., HDMI connection manager 312, and HDMI integrity check 316).

Application environment 306 may include native and high level operating system applications, third party extensions and virtual machine applications, and other application services and extensions. Application environment 306 may include, for example, application runtime manager 308 and application registration module 310.

Processing associated with multimedia applications may be implemented in application environment 306. Such processing may include application runtime manager 308 and application registration module 310. Processing associated with system configuration, including HDMI-related processing, may be implemented in software platform 304. Hardware platform 302 may include various hardware components and interfaces, including a multimedia interface connection with content protection, e.g., HDMI. When an external output device is connected to the WCD, hot plug detect 318 may be used by HDMI connection manager 312 to detect the external output device and interrogate the device to collect information, e.g., display capabilities of the output device and compliance information. HDMI integrity check 316 may utilize the collected information to authenticate the output devices, as described above.

HDMI connection manager 312 may then manage processing associated with multimedia content from the multimedia applications and the multimedia content protection as described above. In one example, HDMI connection manager 312 may be a processing component of display processor and controller 256 of FIG. 2. In another example, HDMI connection manager may be a processing component that is separate from display-specific operations and/or components. The multimedia content protection includes device detection, authentication, encryption, revocation and integrity check. HDMI integrity check 316 may periodically check integrity of the link with the output devices, which may determine whether an output device is disconnected via hot-plug detect 318. Additionally, HDMI connection manager 312 may determine whether a multimedia application is paused or stopped via hot-plug detect 318.

If an output device is disconnected or a multimedia application is paused or stopped, system configuration 314 may set use mode to inactive and reduce or suspend multimedia content processing at high resolution and/or multimedia content protection processing, as discussed above. Reducing multimedia content processing and/or multimedia content protection processing may reduce the amount of battery power consumed by the multimedia application processing associated with external output devices.

Figure 4:
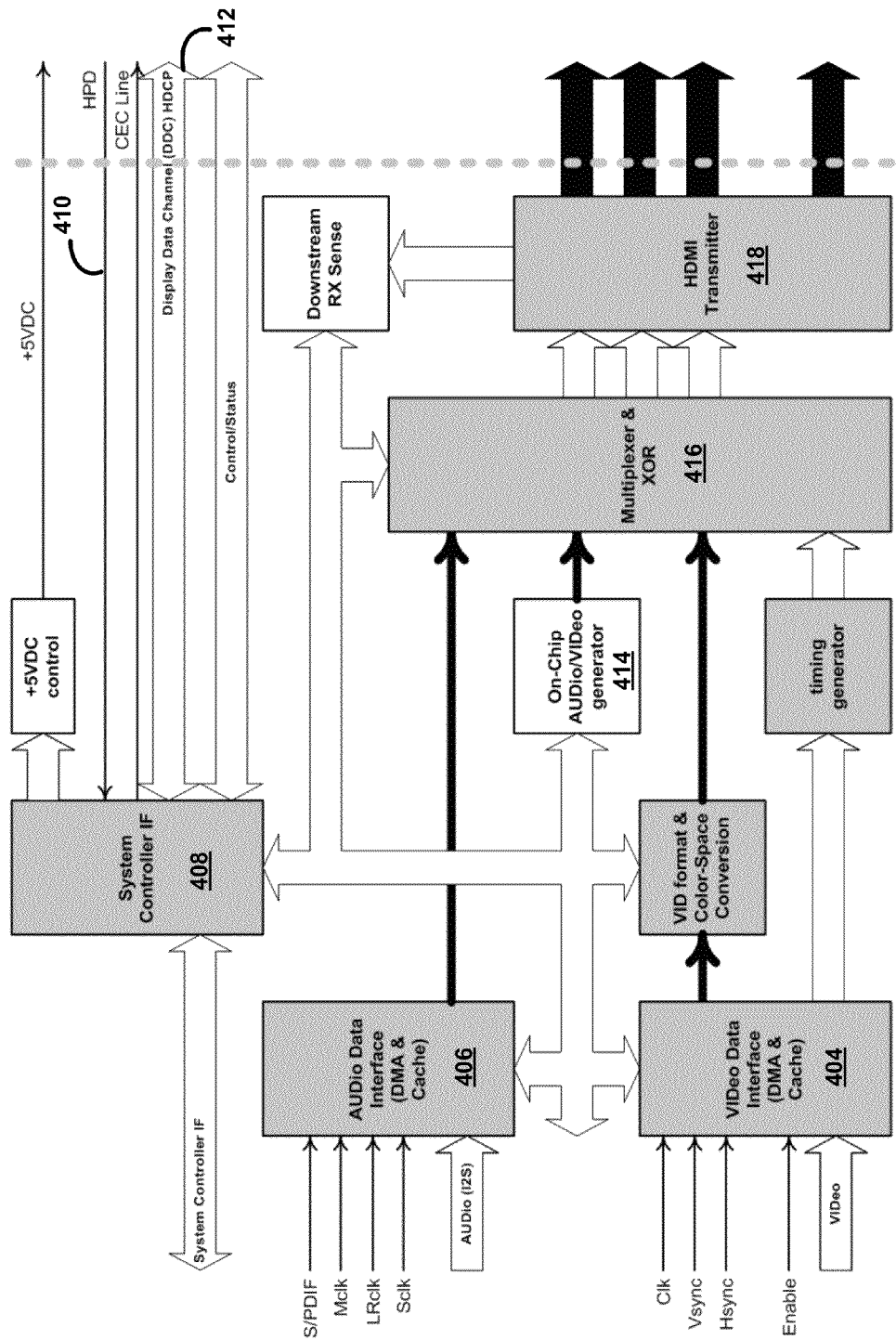
FIG. 4 is a block diagram illustrating an example manager of the multimedia interface with content protection in the WCD during stop or pause of a multimedia application.

FIG. 4 is a block diagram illustrating an example display processor and controller of the multimedia interface with content protection in the WCD. The system shown in FIG. 4 may be implemented in a WCD (e.g., WCD 102 of FIG. 1 or WCD 202 of FIG. 2). In one example, external output devices may be connected to the WCD via a multimedia interface connection with content protection (e.g., HDMI). Content protection processing of the HDMI connection may include performing device detection, authentication, revocation, encryption, and link integrity check for each external device, as explained above.

During detection, system controller 408 may receive from an output device an HPD signal 410 (e.g., +5 VDC) on the HPD pin, causing the WCD to initiate a display data channel (DDC) query 412. The DDC query 412 may interrogate the external HDMI-connected output device to determine the display capabilities of the output device. The DDC query may also determine whether output device 204 is HDCP-compliant.

After detection of the output device, authentication may be performed, where based on the DDC query, the WCD may determine if the output device is authorized to receive the multimedia content from the WCD. The multimedia content may be generated by audio/video generator 414 from local sources on the WCD or from one or more external sources via video data interface 404 and/or audio data interface 406. If the output device is authorized to receive the multimedia content, the WCD then encrypts multimedia content transmitted to the output device using the encryption sessions keys, as explained above. For example, the WCD may include multiplexer and XOR unit 416, which may XOR the multimedia content with cipher values derived from the session key.

The output devices may be presenting multimedia content from the multimedia applications, where high resolution and/or high quality multimedia content may be transmitted to the output devices through HDMI transmitter 418 as long as connection is maintained with the device and the multimedia content is being played by the output device. As noted above, if the output device becomes disconnected or the multimedia application or the output device is paused or stopped, processing of the multimedia content may be modified to reduce the battery power consumption. In one example, when the video paused or stopped, a blank frame or the last displayed frame may be presented.

During video processing, multimedia content may be cached and then processed for transmission by the HDMI transmitter 418 to the output device. The video content may be cached in a video data interface 404 and the audio content may be cached in an audio data interface 406, for example. In one example, when the multimedia application is paused or stopped, a blank frame may be transmitted to the output device for presentation until the multimedia application resumes playing the multimedia content. In another example, when the multimedia application is paused or stopped, the last displayed frame may be presented on the output device. Since the multimedia content is not being played back, the transmitted frame to display while the multimedia application is paused or stopped may not need to be displayed at a high resolution. A cached version of the last frame may be transmitted to the output device, without processing. In this manner, battery power may be reduced as a result of not having to process the frame to produce a high resolution frame. In addition, the last frame or blank frame may be transmitted without having to perform content protection processing, which may further reduce battery consumption.

Figure 5:
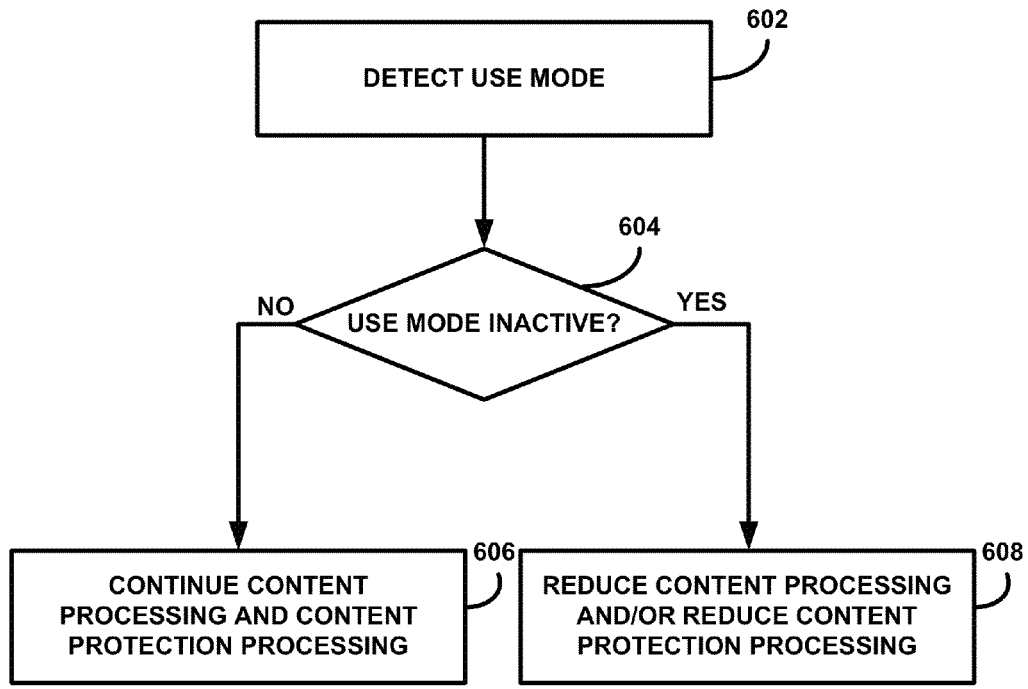
FIG. 5 is a flowchart illustrating an example technique for reducing battery power consumption in a WCD with a multimedia interface with content protection.

FIG. 5 is a flowchart illustrating an example technique for reducing battery power consumption in a WCD with a multimedia interface with content protection. The techniques illustrated in FIG. 5 will be described in relation to processor 112 within WCD 102 of FIG. 1, as an example. WCD 102 may be connected to external output devices 104 for displaying multimedia content. Multimedia applications running on WCD 102 may provide the multimedia content, which may be processed by the processor to provide high resolution multimedia content for presentation on the external output device. Processor 112 may execute an algorithm or control a module that manages the external connection between WCD 102 and output devices 104. The algorithm may manage the connections to reduce battery power consumption in WCD 102 based on operations associated with output devices 104. The operations may include performing content processing and content protection processing of content transmitted from WCD 102 to external output devices 104 via multimedia interface with content protection 118.

In one example, processor 112 may execute the algorithm to detect a use mode associated with the connection between WCD 102 and external devices 104 (602). When an output device is connected to WCD 102 via the multimedia interface connection with content protection 118, and new multimedia content is being processed for transmission to output devices 104, the use mode is active. The algorithm may monitor the connections between WCD 102 and output devices 104 by detecting a signal associated with the connection, e.g., HPD signal. In one example, if the signal is not detected during active operation (e.g., while a multimedia application is running), the algorithm may determine that an output device is no longer connected (e.g., disconnected, turned off, or the like), and may set the use mode to inactive. The algorithm may also monitor the operation of the multimedia applications. In one example, if the algorithm determines that the multimedia application is paused or stopped and not producing any new multimedia content, the algorithm may set the use mode to inactive.

If the use mode is active (NO branch of 604), processor 112 may continue processing the multimedia content and the content protection (606) according to the used standard, e.g., HDCP, and the interface, e.g., HDMI. If the use mode is inactive (YES branch of 604), processor 112 may reduce processing the multimedia content and/or the content protection (608) to reduce the amount of power consumed in connection with the multimedia content processing and content protection.

In the example where the use mode is inactive because one or more external devices is disconnected during active operation, processor 112 may stop processing multimedia content in high resolution typically required for presentation on the disconnected external devices. Processor 112 may instead process multimedia content in a low resolution format that may be more suitable and acceptable for presentation on a local display 124 of WCD 102. In addition to or instead of reducing multimedia content processing, processor 112 may suspend content protection processing for the disconnected multimedia interface connection with content protection 118.

In the example where the use mode is inactive because the multimedia application is paused or stopped, processor 112 may determine that no new content is being transmitted over the multimedia interface connection 118. Processor 112 may then reduce processing of the multimedia content by processing a blank frame or the last displayed frame from the multimedia application at a minimum data resolution acceptable by the external output device. In another example, processor 112 may stop processing content from the multimedia application and instead process a low resolution test pattern or frame cached in a memory 114 of WCD 102 for presentation by output devices 104. In addition to or instead of processing a frame at a low resolution during pause or stop, processor 112 may suspend content protection processing for the multimedia interface connection with content protection, because no unique or new content is being transmitted over the connection. For example, processor 112 may suspend one or more content protection functionalities (e.g., device detection processing, revocation procession, encryption processing, and link-integrity check processing).

Figure 6:
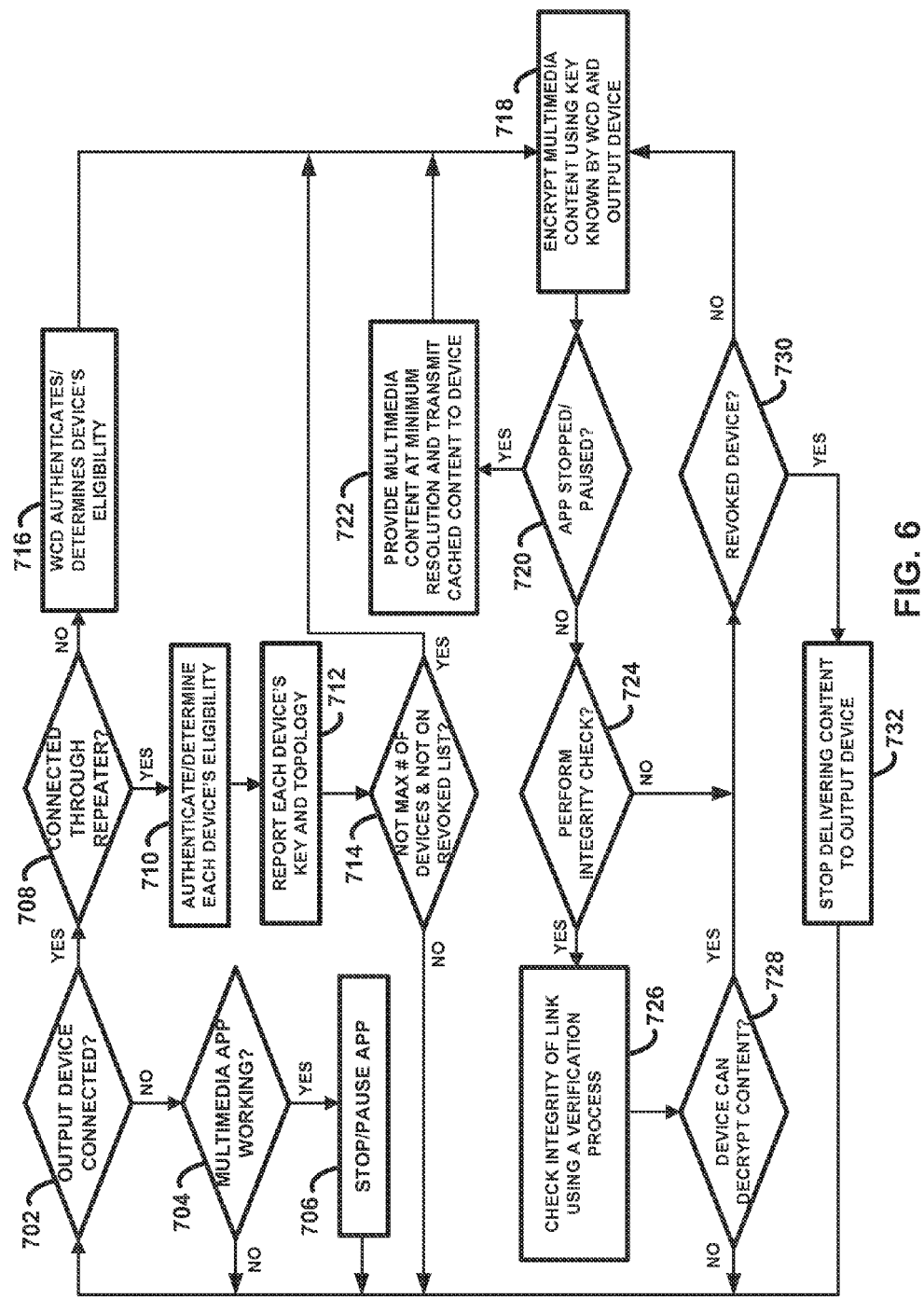
FIG. 6 is a flowchart illustrating an example technique of reducing content processing and/or content protection processing by a WCD when a multimedia interface connection with content protection is inactive.

FIG. 6 is a flowchart illustrating an example technique of reducing content processing and/or content protection processing by a WCD when a multimedia interface connection with content protection is inactive The techniques illustrated in FIG. 6 may correspond to WCD 202 and the WCD architecture described in FIG. 2. WCD 202 may include multimedia applications capable of providing multimedia content for presentation and display. When WCD 202 is not connected to any external output devices 204, WCD 202 may display the multimedia content on a local display 224. When the multimedia content is displayed locally, low-resolution content may be acceptable for presentation on local display 224, because of limitations, such as size of the display and battery power, for example. WCD 202 may also have a multimedia interface with content protection 218, e.g., HDMI, which may be utilized to connect to external output devices 204.

Output devices 204 may be devices capable of presenting multimedia content provided by the multimedia applications and transmitted from WCD 202. Output devices 204 may have certain presentation and display requirements that are different from the local display requirements. For example, the multimedia content may need to be provided at a higher resolution for an acceptable presentation on output devices 204. As such, WCD 202 may include one or more processors capable of processing the multimedia content to provide the content at the resolution and quality required by output devices 204. Additionally, the multimedia content may be processed for transmission over the HDMI interface 218 to provide content protection. Performing the content processing and the content protection processing may consume more battery power than typically consumed when multimedia content is presented locally.

Output devices 204, also referred to as "sinks," may be connected to WCD 202 via the multimedia interface with content protection, e.g., HDMI. Content protection processing for the HDMI connection may include performing device detection, authentication, revocation, encryption, and link integrity check. During its operation, the HDMI connector may detect whether HDMI-sinks (e.g., output devices 204) are connected (702). The HDMI connector may be equipped an HPD pin that allows the repeater/sink (e.g., output devices 204) to provide a signal (e.g., +5 VDC) on HPD so that the output devices are detected. If no device is detected, i.e., no output device is connected to the WCD, the method may determine whether a multimedia application is working (i.e., multimedia application running and providing multimedia content) (704). If no application is working, the method may return to periodically checking whether connection to an external output device is detected. If an application is working, but no external device is connected, all registered applications may be stopped or paused (706). In other words, if no output device is connected and multimedia applications are running, then content processing is switched to local display processing and no content protection processing is performed until a connected output device is detected at (702).

If at (702), external output devices are detected, management of the HDMI may perform authentication. If during device detection it is determined that an external device is connected, the method may determine whether the external device is connected through a repeater (708). If the external device is connected through a repeater, the repeater may authenticate each external output device connected thereto to determine the devices' eligibility (710). A device's eligibility may include whether the output device is authorized to receive multimedia content from the WCD. The repeater may then report each device's private key and connection topology to the WCD (712). The method may then determine whether the maximum number of connected repeaters and sinks (i.e., output devices) has not yet been reached, and whether the detected device (sink) is not on the list of revoked devices (714). For example, in HDCP, up to 127 sinks with 7 repeaters are allowed as output devices. Therefore, the check may be whether less than 7 repeaters and 127 output devices are connected to the WCD. If the maximum number of repeaters or output devices is connected to the WCD or the detected output device is on the list of revoked devices, the connection is not established and the method may return to periodically checking whether connection to an external output device is detected. If the maximum number of repeaters and output devices is not yet reached, and the detected output device is not on the list of revoked devices, the method may proceed to encryption of the content using a session key known by the WCD and the output device (718).

If the external output device is not connected through a repeater, the WCD may authenticate the connected output device to determine its eligibility (716). The method may then proceed to encryption of the multimedia content by the WCD, using a session key known by the WCD and the output device (718). The output device may be expected to decrypt and render the multimedia content using the session key. When output devices are connected and authenticated, the method may check whether any multimedia application providing content is stopped or paused (720). If a multimedia application is stopped or paused, the HDMI connection may be configured to process the multimedia content at a minimum resolution, and cached content may be transmitted to the external output device (722). For example, the cached content may be a blank frame or the last presented frame for video content and/or the audio content may be set to mute. In this manner, processing of the content may be minimized and the amount of battery power consumed may be reduced. Additionally, while the multimedia application is stopped or paused, WCD 202 may stop or reduce content protection processing, including device detection, content encryption, link integrity check, and revocation.

If no multimedia application is paused or stopped, the method may continue to perform link integrity check. For link integrity check, the method may involve checking if the currently-processed frame is where an integrity check should be performed, e.g., frame 128 since the last check (724). If the a check should be performed, the WCD may check integrity of the link with the corresponding output devices to ensure encryption of the multimedia content is reliable, by using a verification process (726). For example, the source (e.g., the WCD) may utilize a 16-bit integrity check delivered by the output devices every 128 frames. The verification process may occur periodically, e.g., every 1.5-2.5 seconds, for example. The method may also include the WCD determining whether the output device can correctly decrypt the protected (i.e., encrypted) multimedia content (728). The output device can correctly decrypt the protected multimedia content if the output device has the same session key. If the WCD determines that the output device cannot correctly decrypt the protected content, the method may return to periodically checking whether connection to an external output device is detected.

If the WCD determines that the output device can correctly decrypt the protected content, the WCD may determine whether the output device is a revoked device (730). A device is revoked if the device's KSV is in any SRM provided within the multimedia content. If the output device is revoked, the WCD may stop content delivery to the output device and purge its KSV (732). The method may then return to periodically checking whether connection to an external output device is detected. If the output is not revoked, the method may return to encryption of the multimedia content for transmission to the sink (718).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method of managing multimedia connections of a wireless communication device, the method comprising:
    detecting, with a processor in the wireless communication device, one of an active or inactive use mode of a connection between the wireless communication device and one or more output devices, wherein the connection comprises a multimedia interface connection with content protection;
    performing an amount of content processing based on the detected use mode of the connection for at least one application of the wireless communication device for presentation by the output devices, wherein, when the detected use mode is the inactive use mode, performing the content processing comprises performing content processing for the at least one application at a reduced resolution; and
    performing an amount of content protection processing based on the detected use mode of the connection for secure transmission of the processed content to the output devices via the connection, wherein, when the detected use mode is the inactive use mode, performing the content protection processing comprises performing authentication processing to maintain the connection with the output devices and suspending revocation processing and link-integrity check processing.

2. The method of claim 1, wherein the connection comprises a high-definition multimedia interface (HDMI) connection.

3. The method of claim 1, wherein detecting a use mode of a connection comprises monitoring the connection for a hot-plug-detect (HPD) signal to indicate that the one or more output devices are connected to the wireless communication device, wherein the use mode is inactive when the HPD signal is not detected.

4. The method of claim 3, wherein performing the content processing comprises, when the HPD signal is not detected, performing content processing for the at least one application of the wireless communication device at the reduced resolution for presentation by only the wireless communication device.

5. The method of claim 1, wherein detecting a use mode of a connection comprises monitoring operation of the at least one application, wherein the use mode is inactive when the operation of the application is one of paused or stopped.

6. The method of claim 5, wherein performing the content processing comprises, when the operation of the application is one of paused or stopped, performing content processing for the at least one application for presentation by the output devices at a minimum resolution accepted by the output devices.

7. The method of claim 6, wherein performing the content protection processing comprises, when the operation of the application is one of paused or stopped, performing encryption processing for secure transmission of the minimum resolution content to the output devices via the connection, and suspending at least one of device detection processing, revocation processing, and link-integrity check processing.

8. The method of claim 1, wherein performing the content protection processing comprises performing authentication processing to maintain the connection with each of the one or more output devices when the use mode of the connection is inactive to avoid re-authentication processing.

9. A wireless communication device capable of managing multimedia connections, the wireless communication device comprising:
    a multimedia interface with content protection that forms a connection between the wireless communication device and one or more output devices; and
    one or more processors configured to:
        detect one of an active or inactive use mode of the connection between the wireless communication device and one or more output devices,
        performs an amount of content processing based on the detected use mode of the connection for at least one application of the wireless communication device for presentation by the output devices, wherein, when the detected use mode is the inactive use mode, the processors perform content processing for the at least one application at a reduced resolution, and
        performs an amount of content protection processing based on the detected use mode of the connection for secure transmission of the processed content to the output devices via the connection, wherein, when the detected use mode is the inactive use mode, the processors perform authentication processing to maintain the connection with the output devices and suspend revocation processing and link-integrity check processing.

10. The device of claim 9, wherein the connection comprises a high-definition multimedia interface (HDMI) connection.

11. The device of claim 9, wherein to detect a use mode of a connection, the one or more processors monitor the connection for a hot-plug-detect (HPD) signal to indicate that one or more output devices are connected to the wireless communication device, wherein the use mode is inactive when the HPD signal is not detected.

12. The device of claim 11, wherein when the HPD signal is not detected, the one or more processors perform content processing for the at least one application of the wireless communication device at the reduced resolution for presentation by only the wireless communication device.

13. The device of claim 9, wherein to detect a use mode of a connection the one or more processors monitor operation of the at least one application, wherein the use mode is inactive when the operation of the application is one of paused or stopped.

14. The device of claim 13, wherein when the operation of the application is one of paused or stopped, the one or more processors perform content processing for the at least one application for presentation by the output devices at a minimum resolution accepted by the output devices.

15. The device of claim 14, wherein when the operation of the application is one of paused or stopped, the one or more processors perform encryption processing for secure transmission of the minimum resolution content to the output devices via the connection, and suspend device detection processing, revocation processing, and link-integrity check processing.

16. The device of claim 9, wherein to perform content protection processing the one or more processors perform authentication processing to maintain the connection with each of the one or more output devices when the use mode of the connection is inactive to avoid re-authentication processing.

17. A wireless communication device capable of managing multimedia connections, the wireless communication device comprising:
   means for detecting one of an active or inactive use mode of a connection between the wireless communication device and one or more output devices, wherein the connection comprises a multimedia interface connection with content protection;
   means for performing an amount of content processing based on the detected use mode of the connection for at least one application of the wireless communication device for presentation by the output devices, wherein, when the detected use mode is the inactive use mode, the means include means for performing content processing for the at least one application at a reduced resolution; and
   means for performing an amount of content protection processing based on the detected use mode of the connection for secure transmission of the processed content to the output device via the connection, wherein, when the detected use mode is the inactive use mode, the means include means for performing authentication processing to maintain the connection with the output devices and means for suspending revocation processing and link-integrity check processing.

18. The device of claim 17, wherein the connection comprises a high-definition multimedia interface (HDMI) connection.

19. The device of claim 17, wherein the means for detecting a use mode of a connection comprises means for monitoring the connection for a hot-plug-detect (HPD) signal to indicate that one or more output devices are connected to the wireless communication device, wherein the use mode is inactive when the HPD signal is not detected.

20. The device of claim 19, wherein, when the HPD signal is not detected, the means include means for performing content processing for the at least one application of the wireless communication device at the reduced resolution for presentation by only the wireless communication device.

21. The device of claim 17, wherein the means for detecting a use mode of a connection comprises means for monitoring operation of the at least one application, wherein the use mode is inactive when the operation of the application is one of paused or stopped.

22. The device of claim 21, wherein, when the operation of the application is one of paused or stopped, the means include means for performing content processing for the at least one application for presentation by the output devices at a minimum resolution accepted by the output devices.

23. The device of claim 22, wherein, when the operation of the application is one of paused or stopped, the means include means for performing encryption processing for secure transmission of the minimum resolution content to the output devices via the connection, and means for suspending device detection processing, revocation processing, and link-integrity check processing.

24. The device of claim 17, wherein the means for performing content protection processing comprises means for performing authentication processing to maintain the connection with each of the one or more output devices when the use mode of the connection is inactive to avoid re-authentication processing.

25. A computer program product comprising a non-transitory computer-readable storage medium having stored thereon instructions that, when executed, cause a processor of a wireless communication device to:
   detect one of an active or inactive use mode of a connection between a wireless communication device and one or more output devices, wherein the connection comprises a multimedia interface connection with content protection;
   perform an amount of content processing based on the detected use mode of the connection for at least one application of the wireless communication device for presentation by the output devices, wherein, when the detected use mode is the inactive use mode, the instructions cause the processor to perform content processing for the at least one application at a reduced resolution; and
   perform an amount of content protection processing based on the detected use mode of the connection for secure transmission of the processed content to the output device via the connection, wherein, when the detected use mode is the inactive use mode, the instructions cause to processor to perform authentication processing to maintain the connection with the output devices and suspend revocation processing and link-integrity check processing.

26. The computer program product of claim 25, wherein the connection comprises a high-definition multimedia interface (HDMI) connection.

27. The computer program product of claim 25, wherein the instructions that cause the processor to detect a use mode of a connection comprise instructions that cause the processor to monitor the connection for a hot-plug-detect (HPD) signal to indicate that one or more output devices are connected to the wireless communication device, wherein the use mode is inactive when the HPD signal is not detected.

28. The computer program product of claim 27, wherein, when the HPD signal is not detected, the instructions cause the processor to perform content processing for the at least one application of the wireless communication device at the reduced resolution for presentation by only the wireless communication device.

29. The computer program product of claim 25, wherein the instructions that cause the processor to detect a use mode of a connection comprise instructions that cause the processor to monitor operation of the at least one application, wherein the use mode is inactive when the operation of the application is one of paused or stopped.

30. The computer program product of claim 29, wherein, when the operation of the application is one of paused or stopped, the instructions cause the processor to perform content processing for the at least one application for presentation by the output devices at a minimum resolution accepted by the output devices.

31. The computer program product of claim 30, wherein, when the operation of the application is one of paused or stopped, the instructions cause the processor to perform encryption processing for secure transmission of the minimum resolution content to the output devices via the connection, and suspend at least one of device detection processing, revocation processing, encryption processing, and link-integrity check processing.

32. The computer program product of claim 25, wherein the instructions cause the processor to perform authentication processing to maintain the connection with each of the one or more output devices when the use mode of the connection is inactive to avoid re-authentication processing.

* * * * *

UNITED STATES PATENT AND TRADEMARK OFFICE
CERTIFICATE OF CORRECTION

PATENT NO.       : 8,838,845 B2  
APPLICATION NO.  : 13/243548  
DATED            : September 16, 2014  
INVENTOR(S)      : Khosro Mohammad Rabii Page 1 of 1

It is certified that error appears in the above-identified patent and that said Letters Patent is hereby corrected as shown below:

In The Claims

Claim 9, column 18, line 26, "performs" should be changed to -- perform --

Claim 9, column 18, line 33, "performs" should be changed to -- perform --

Claim 25, column 20, line 30, "to processor to perform" should be changed to -- the processor to perform --

Signed and Sealed this
Sixteenth Day of August, 2016

Michelle K. Lee
*Director of the United States Patent and Trademark Office*